US006588904B2

United States Patent
Morton et al.

(10) Patent No.: US 6,588,904 B2
(45) Date of Patent: Jul. 8, 2003

(54) SYSTEM FOR COMPENSATING FOR FILM FLUTTER IN A MOTION PICTURE PROJECTOR

(75) Inventors: Roger A. Morton, Penfield, NY (US); Christopher L. Dumont, Webster, NY (US); Kenneth J. Repich, Fairport, NY (US); Alan T. Brewen, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/982,462

(22) Filed: Oct. 18, 2001

(65) Prior Publication Data

US 2002/0047998 A1 Apr. 25, 2002

Related U.S. Application Data

(60) Provisional application No. 60/241,685, filed on Oct. 19, 2000.

(51) Int. Cl.[7] ................................. G03B 1/48
(52) U.S. Cl. ................... 352/228; 352/229; 353/95
(58) Field of Search ............... 352/40, 56, 229, 352/221, 140, 228; 353/69, 95

(56) References Cited

U.S. PATENT DOCUMENTS

| | | | | |
|---|---|---|---|---|
| 2,947,215 A | * | 8/1960 | Mitchell | 353/69 |
| 3,007,368 A | * | 11/1961 | Roselblum | 352/184 |
| 3,617,119 A | * | 11/1971 | Pagel | 352/140 |
| 3,639,048 A | * | 2/1972 | Heaney et al. | 353/101 |
| 3,650,615 A | * | 3/1972 | Aoki et al. | 353/101 |
| 4,494,839 A | * | 1/1985 | Brueckner | 353/101 |
| 4,522,476 A | | 6/1985 | Renold | |
| 5,341,182 A | * | 8/1994 | Schmidt | 352/184 |
| 5,875,020 A | | 2/1999 | Kitten et al. | |

* cited by examiner

Primary Examiner—Russell Adams
Assistant Examiner—D. Ben Esplin
(74) Attorney, Agent, or Firm—Andrew J. Anderson

(57) ABSTRACT

A system for compensating for film flutter in a motion picture film projector during projection of a motion picture film comprising multiple film image frames is described, the system comprising sensing the position of film image frames in a film gate of the projector relative to the focal plane of the projection lens assembly of the projector as the film image frames are being projected, and correcting the position of the film in the film gate of the projector or the position of the focal plane of the projection lens assembly to reduce the distance between the film image and the focal plane of the projection lens assembly as the film image frames are being projected, wherein the correction of the position of an individual film image frame in the film gate or that of the position of the focal plane of the projection lens assembly during projection of the individual frame image is based on the actual sensed position of the individual film image frame in the film gate, or on the position of a previously projected film image frame which was sensed as it was being projected.

20 Claims, 7 Drawing Sheets

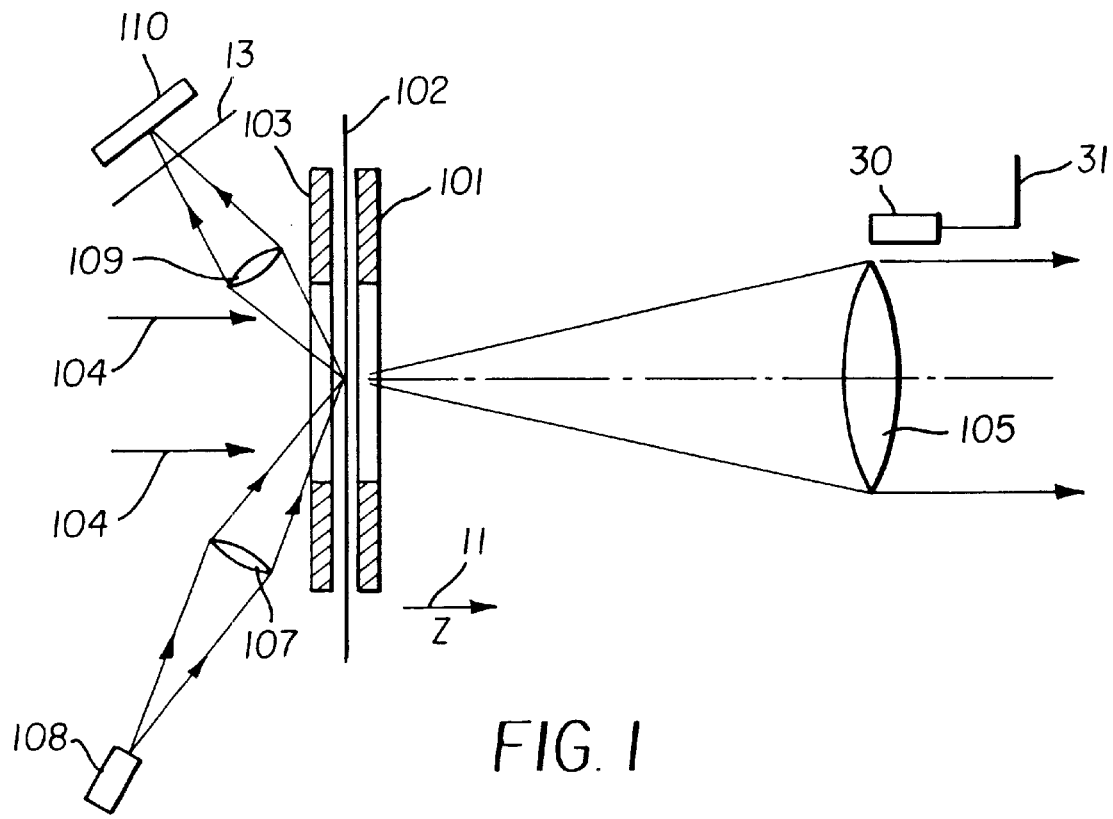
FIG. 1
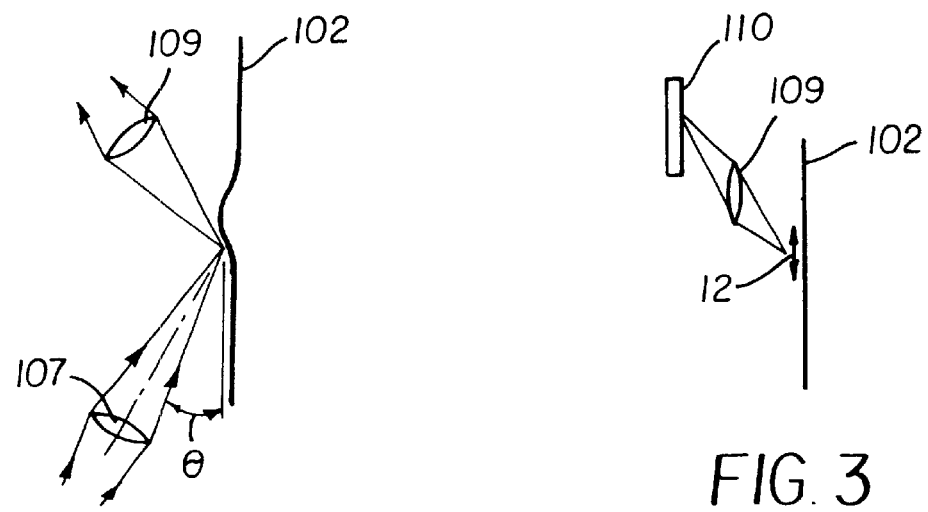
FIG. 2
FIG. 3

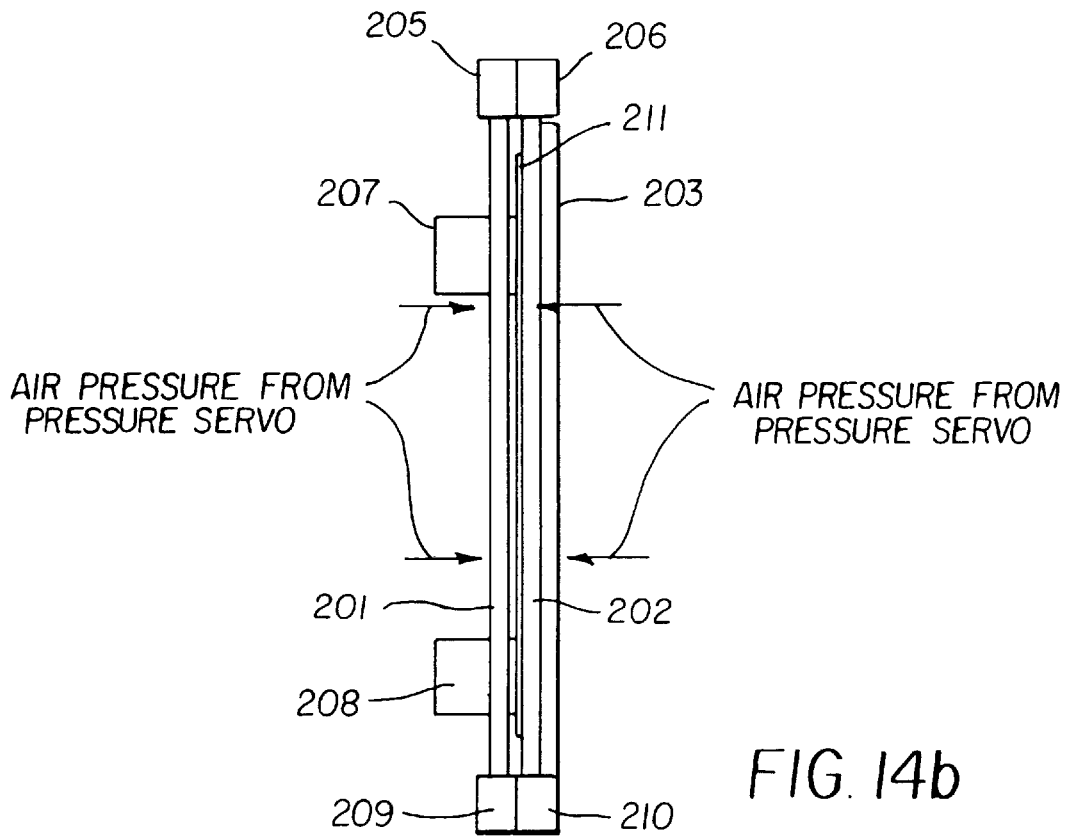
FIG. 14b
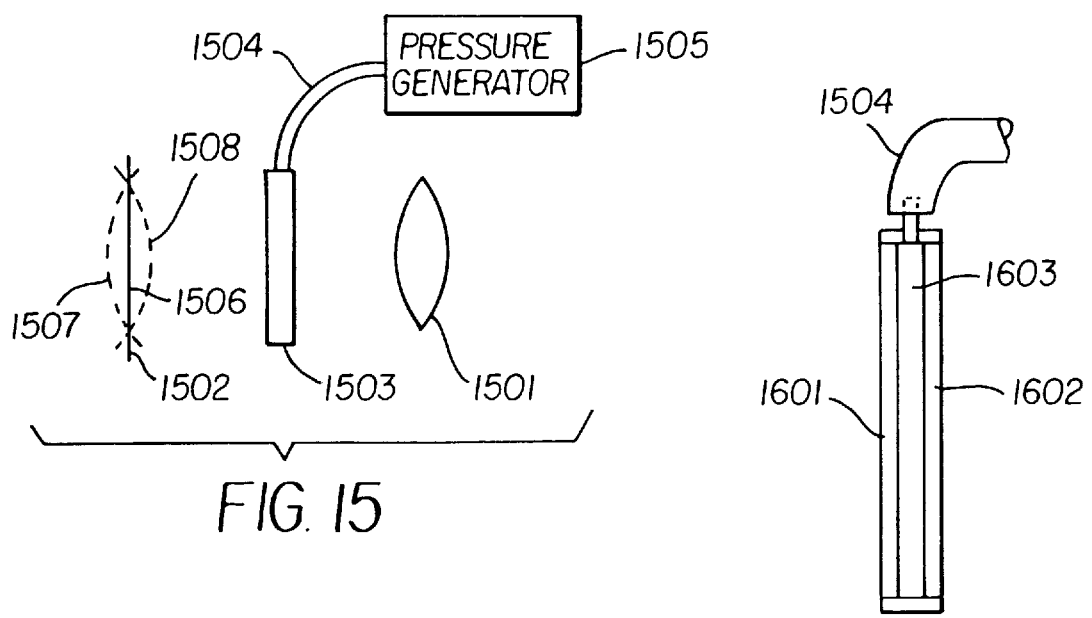
FIG. 15
FIG. 16

SYSTEM FOR COMPENSATING FOR FILM FLUTTER IN A MOTION PICTURE PROJECTOR

CROSS REFERENCE TO RELATED APPLICATION

Reference is made to and priority is claimed from U.S. Provisional Application Serial No. 60/241,685, filed Oct. 19, 2000, entitled "System For Compensating For Film Flutter In A Motion Picture Projector".

FIELD OF THE INVENTION

This invention relates generally to the field of motion picture projection, and more specifically to a system for correcting the position of film in a projector film gate relative to the focal plane of the projector lens.

BACKGROUND OF THE INVENTION

General descriptions of motion picture projectors can be found in Motion-Picture Projectors and Theater Presentation Manual, Don V Kloepfel, Editor, Society of Motion Picture and Television Engineers, 1969, Library of Congress number 78-95387. The general construction of a conventional motion-picture projector is schematically illustrated in FIG. 7. Film projectors employ various types of film looping between feed and take-up reels. Traditional film projection systems have a film-transport wheel, called an intermittent sprocket, which pulls the film through a film gate one image frame at a time. Film loops in conventional systems compensate for rapid changes of un-reeled length of film above and below a film gate as a result of timed stops of the film at the film gates between evenly synchronized feed and take-up of the film by the respective reels. While stationed in the film gate, light generated in a lamp housing is directed through the film image frame, and through the projector's projection lens assembly where it is focused for projection on a screen.

Motion picture films comprise transparent film supports with imaging layer(s) thereon which comprise the film images in the form of varying silver metal (in the case of black and white films) or dye (in the case of color films) densities in individual image frames. Motion picture projectors create a projected image on a screen by directing intense light through the motion picture film image frames while the frames are positioned in a projector film gate and imaging it to a screen. Because of the intense light, heat is created in the film when it is in the film gate. This heat can cause the film to buckle, flutter and bend. The heat is primarily generated in the film imaging layer(s) as it absorbs light in the dark areas of the image. This heat causes an increase in temperature that makes the film expand and move away from the focal plane of the projector's projection lens assembly. The result is a less sharp projected image, because the motion of the film can move it outside of the depth of field of the projection lens.

Willy Borberg in a paper in the SMPTE Journal in October 1957 as well as an earlier paper in 1952 in the SMPTE Journal indicates that film flutter or motion of the film due to heating can cause film to move out of focus. His initial solution was to blow air on the film to keep it cool and to blow air to generate pressure to keep the film in the plane of focus. Additional prior art which discloses the use of blown air to cool or try to prevent film flutter includes U.S. Pat. No. 5,875,020. U.S. Pat. No. 5,341,182 discloses the use of blown air to advance film through a projection sequence, and the use of vacuum pressure to secure the film to a gate. U.S. Pat. No. 4,522,476 discloses the use of pressure pads which may be moved into and out of engagement with a film passing through the film gate of a projector. Although the use of blowing air has been used in a number of theatres (with or without additional film alignment tactics), there has been no attempt to compensate for the different amounts of heat absorbed by each image frame in a motion picture film. Nor has there been any attempt to compensate for the fact that the heat may be distributed non-uniformly across the image frame. In addition, the prior art has not provided a system to compensate for the fact that different films have different buckle characteristics due to base, age and warpage. Accordingly, it would be desirable to provide a system which would allow for active compensation of the position of the film in the film gate of a motion picture projector to selectively compensate for film flutter as a motion picture film is being projected.

SUMMARY OF THE INVENTION

In accordance with one embodiment of the invention, a system for compensating for film flutter in a motion picture film projector during projection of a motion picture film comprising multiple film image frames is described, the system comprising sensing the position of film image frames in a film gate of the projector relative to the focal plane of the projection lens assembly of the projector as the film image frames are being projected, and correcting the position of the film in the film gate of the projector or the position of the focal plane of the projection lens assembly to reduce the distance between the film image and the focal plane of the projection lens assembly as the film image frames are being projected, wherein the correction of the position of an individual film image frame in the film gate or that of the position of the focal plane of the projection lens assembly during projection of the individual frame image is based on the actual sensed position of the individual film image frame in the film gate, or on the position of a previously projected film image frame which was sensed as it was being projected.

In accordance with specific embodiments of the invention, light absorption characteristics of the film may be measured and used to predict the flutter or buckle of the film. The actual position of the film may then be sensed and the prediction algorithm modified so that the prediction is more accurate for the next frame of the motion picture image. This invention system actively senses the position of motion picture film in the film gate and adjusts the position of the film or focal plane of the projection lens assembly of the projector to bring the film image back into the focal plane of the projection lens during projection of the film. The film may be flat in the focus plane or may be curved depending on factors such as the projector and lens design.

BRIEF DESCRIPTION OF THE FIGURES

FIG. 1 shows a schematic side view of a film projection system with an optical film position sensing system which may be used in accordance with one embodiment of the invention.

FIG. 2 shows a portion of the film position sensing system of FIG. 1 with exaggerated film buckle.

FIG. 3 shows a portion of the film position sensing system of FIG. 1 with modified receiving optical system.

FIG. 15 shows a schematic view of a projection lens system with adjustable focal plane which may be used for correcting for film flutter in accordance with an embodiment of the invention.

FIG. 16 schematically illustrates a liquid inflatable lens which may be used in the projection lens system of FIG. 15.

DETAILED DESCRIPTION OF THE INVENTION

Figure 4:
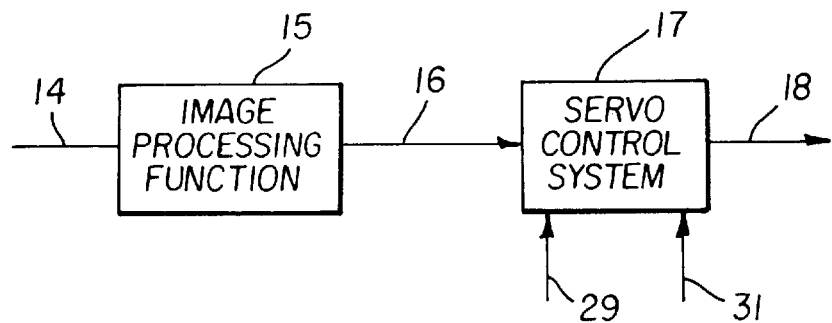
FIG. 4 is a block diagram of a film displacement signal processing and film position servo control system for use with the film projection system of FIG. 1.

FIG. 1 shows a side view of a projection system, including an optical position sensing system which may be used to sence the position of the film in the film gate in accordance with one embodiment of the invention as a motion picture film is being projected. A film gate 101 has the film 102 pressed against it by spring loaded plate 103. Light 104 falls onto the film and is selectively absorbed by the film emulsion to form an image that is projected by lens 105 to the motion picture screen (not shown). As part of the optical position sensing system, imaging lens 107 images the light from infrared laser diode 108 onto the film 102, and a sensing system uses lens 109 to form an image of the spot on to a charge coupled device (CCD) sensor 110. Thus, CCD 110 senses the position of the spot formed by laser diode 108 and lens 107 on film 102. This position of the spot on the film depends on the degree of motion of the film in the z-axis 11 perpendicular to the film plane.

The sizes of the apertures of lens 109 and lens 107 are important. The apertures must be sufficiently large, so that even if the film is buckled (as shown in exaggerated form in FIG. 2) some portion of the bundle of the light from lens 107 will still reflect or be scattered off the film and fall within the aperture of lens 109 to form an image on CCD 110.

Defining the z-axis as direction 11, the displacement x of the spot on the film as a function of the film motion at the position of the spot is given by $$x = z_{film\ displacement} \cotangent \theta$$

where $\theta$ is the angle between the center of the optical axis of the illuminating path to the film plane and $z_{film\ displacement}$ is the displacement of the film at the point of illumination in the z direction.

Depending on the details of the design of the receiving optical system, it may be desirable that the angle of CCD 110 and the angle of collecting lens 109 with respect to the optical axis of the sensing system be set to maintain focus across displacement range. Consequently, as the spot moves, due to the motion of the film, in direction 12 on the film as illustrated in FIG. 3, focus onto the CCD is maintained. The optimal angles of the lens primary axis, the CCD focal plane, and the film plane will be a function of the magnification of the optical system (which is determined by the pixel spacing on the CCD and the desired accuracy of z motion sensing).

Because of the high light level of the projector lamp, it may be desirable to take some or all of the following steps, to ensure that this light level does not blind the CCD sensor and prevent it from seeing the spot from laser 108.

1. Add a narrow bandwidth filter in plane 13 to block out all frequency spectra except the frequency spectra of the laser illuminator 108.
2. Modulate the laser diode 108 and modulate the exposure CCD 110 in synchronism. This allows the laser diode to operate at higher peak 1 intensity, thereby minimizing the impact of background light.
3. Modulate the laser diode and use a synchronous detector circuit to process the signal from the CCD. One exposure is performed with the laser diode on, and the next exposure is performed with the laser diode off Then, each pixel value with the laser diode on is subtracted from the value of the corresponding pixel with the laser diode off. This has the effect of canceling out the value of the background light. This process may be performed repeatedly to build up better noise free image data.
4. Include a filter in the optical path of the projector illumination system so that light 104 (FIG. 1) is free of or has highly reduced intensities of the component whose wavelength corresponds to the wavelength of the infrared laser diode 108.

Figure 10:
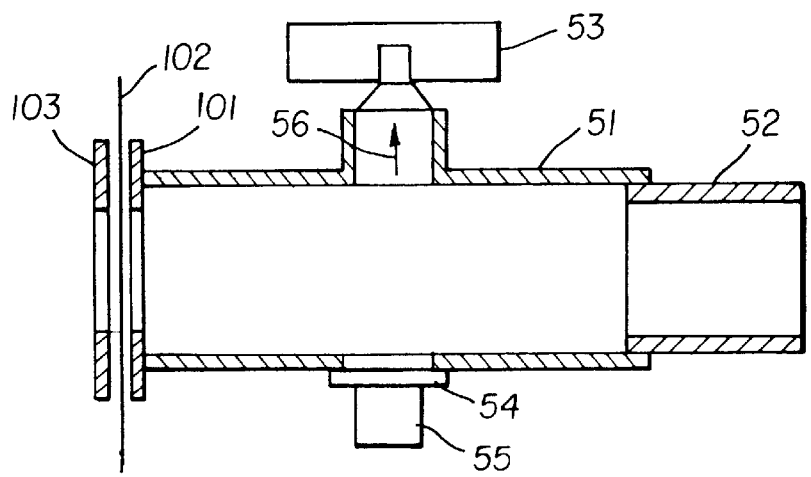
FIG. 10 shows a schematic view of a loud speaker system for controlling position of film in a film gate.

It will be appreciated that the illumination and sensor assembly 108, 104, 109, 13 and 110 can be placed on either the illumination side of the film as shown in FIG. 1 or on the projection side of the film. There are advantages in having the assembly on the projector lens side of the film including being away from the shutter, being exposed to a lower light level, not being influenced by the temperature of the air which will produce shimmer thereby adding noise to the reading. The disadvantages of being on the projection lens side of the film include interference with the film gate during threading. To address this it may be necessary in some designs to make the assembly 108, 107, 109, 13 and 110 be an integral component of the film gate on the projection side in order to minimize interference when threading the film. Another disadvantage of being on the projection lens side is that care must be taken that it does not interfere with the pressure assembly comprising tube 51, loud speaker 53 and the related components (FIG. 10).

The advantage of being on the illumination side as shown in FIG. 1 is that it does not interfere with the threading operation. Thus, the decision on which side to place the assembly is a design decision depending on the overall design of the projector in which this feature is incorporated.

The CCD sensor 110 may be an area CCD or a linear CCD sensor. Alternatively, the sensor may be a special purpose sensor that generates signals as a function of the X and/or Y coordinates of the spot of light imaged to the sensor.

Alternatively, it is possible to optically sense film position without additional illumination by setting the sensing assembly 109, 110 at close to right angles to the optical axis and sensing the scattered light from the projector illuminator.

Figure 14A:
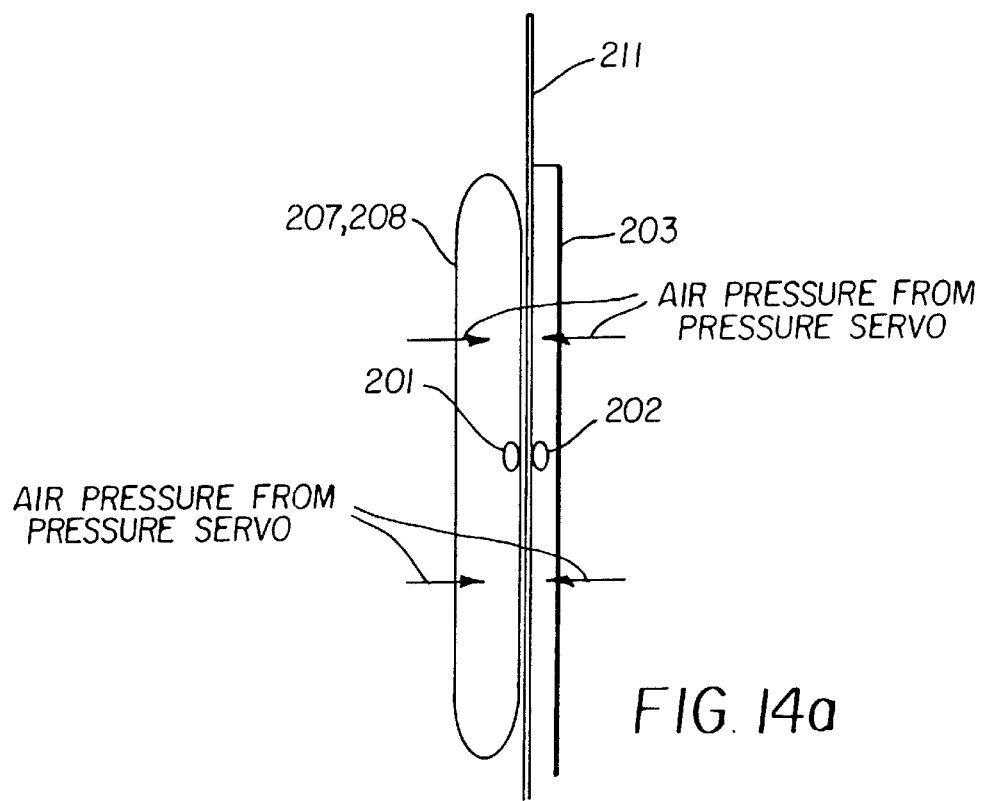
FIGS. 14a (side view) and 14b (top view) show an alternative optical film position sensing system which may be used in accordance with another embodiment of the invention.

FIG. 14*a* shows an alternative optical system for sensing the film 211 in the gate from a side view. FIG. 14*b* shows the alternative optical system of sensing the film in the gate from a top view. Beams 201, 202 from a laser diode or diodes 205, 206 pass across the film as it is positioned in the film gate. Beam 201 passes across thin bands 207, 208, while beam 202 passes through a hole or grove in the pressure plate 203. Sensors 209, 210 (which may be individual laser diodes or a linear or area CCD or device which generates voltage as a function of the beam position falling on it) sense the amount of movement of the film position by attenuation of the light received by the sensors as the film moves into the beam path.

In FIG. 4, the signal from CCD 110 passes on line 14 to image processing function 15. The image processing function 15 processes the signal (image data) on line 14 to determine the film displacement amplitude in the z direction. This image processing involves a first step of segmenting or thresholding the image of the spot that corresponds to the image of the laser beam on the film. Next, the center of gravity of the spot or the position of the spot on the CCD is determined. Then a transformed version of the above equation (or function related to the geometry of the sensing system) is used to compute the displacement of the film at the point of illumination in the z direction.

This z displacement data is then output on line 16 to the servo control system function 17 where a signal is generated on line 18 to control the position of the film.

Figure 13:
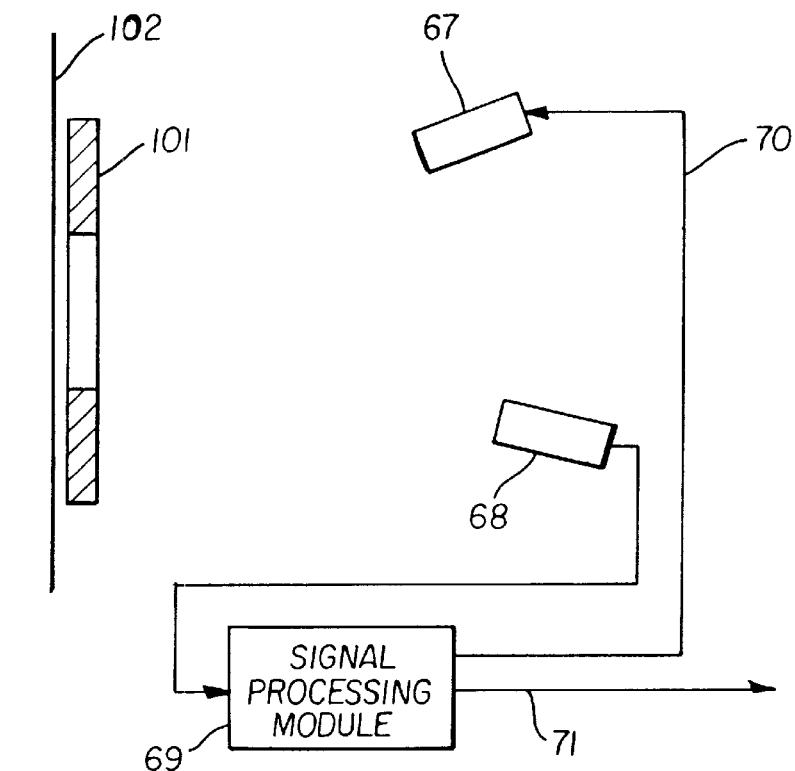
FIG. 13 shows a diagrammatic view of sonar film position sensing system which may be used in accordance with another embodiment of the invention.

The position of the film may alternatively be acoustically sensed, e.g., by using sonar sensing in place of optical sensing as illustrated in FIG. 13. The basic technique involves reflection of sonar signals off the film to sense its position. Sonar transmitter 67 transmits audio or ultrasonic waves in a focused narrow beam to film 102 and these waves are reflected back to sensor 68. Signal processing module 69 receives the reflected signal and processes that reflected signal based on the information it provides through lines 70 to sonar transmitter 67. Thus, a distance signal 71 is generated which is sent to servo control module 17 as well as the signal on line 16 from the image-processing module 15.

Figure 5:
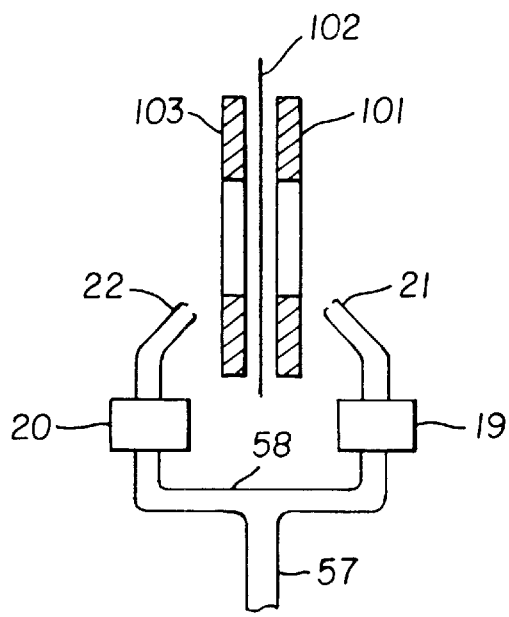
FIG. 5 shows a schematic view of an air pressure system for controlling position of film in a film gate.

FIG. 5 shows an exemplary air pressure system for controlling the position of the film. Air under pressure enters on air supply pipe 57 and is directed through T-junction 58 to rapid control valves 19 and 20. These valves have a very short response time and modulate the air to nozzles 21 and 22 that control the amount of air directed to each side of film 102. Line 18 controls valves 19 and 20.

Figure 6:
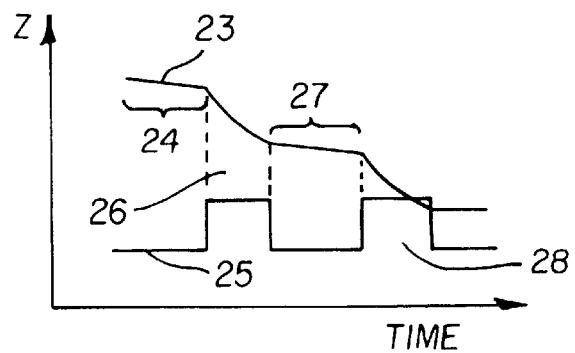
FIG. 6 shows a typical profile of film displacement in a film gate in the z direction over time during exposure by a 2-bladed shutter.
Figure 7:
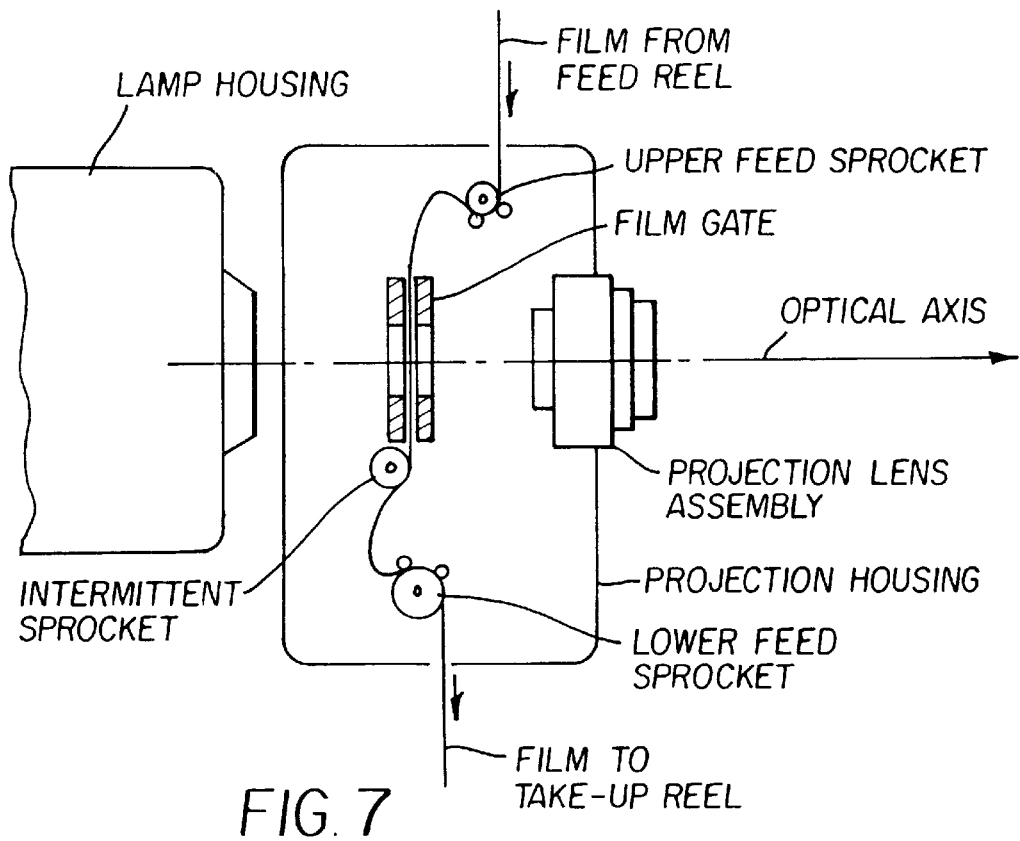
FIG. 7 shows a schematic view of the general construction of a conventional motion-picture projector.

FIG. 6 shows a typical profile of the film during exposure by a 2-bladed shutter. Generally a film projector operates at 24 frames per second and a two bladed shutter is used which causes light to fall on the film (and consequently the projection screen) 48 times per second. Thus, there are two exposures per frame of film. The time span during which the frame is exposed and the two exposures take place is shown in FIG. 6. Line 23 designates the z position of the film during the time that one frame of the film is in the film gate. The film enters the film gate during period 24 and then the shutter opens so that the light level on the film increases as shown diagrammatically by waveform diagram 25. The light therefore heats up the film and this causes the film to move during period 26 to displace it in the z direction during the first exposure of the shutter. During period 27 between the first and second exposure, if there is little opportunity for the film to cool down it will maintain approximately the same z position as shown. If however the film cools it will move back towards position 23. During the second exposure in period 28, the film is further heated and the displacement is increased. Next, a new unheated frame enters the film gate and the process is repeated.

The value of the film displacement will depend on how much light is absorbed by each frame. In general, frames, which produce a dark image on the projection screen, will suffer greater displacement than frames whose image is brighter.

The servo system 17 shown in FIG. 4 may be designed to specifically compensate for the variation in z displacement by simultaneously using a number of control strategies outlined as follows. It should be pointed out that the optimum strategy is a function of a number of factors including the design of the projector, the position and shape of the film in the gate which is defined as the in focus profile (which depends on system and lens design), human factors models used to define the way the viewer's eye senses sharpness, whether the design is a retrofit to existing projectors or is a design for anew projector the selection of the alternative sensing and position control means used.

Based on these decisions the optimal control strategy may be chosen from the appropriate combinations of the following:

1. Instantaneous compensation within one exposure. Generally, a small portion of the total z-axis displacement correction can be achieved by instantaneously correcting the current position of the film during the exposure. Taken alone, this compensation strategy will generally be insufficient, because the response time of the control means will typically be too slow. Specifically, (as shown in FIG. 5) the valves 19 and 20 and nozzles 21 and 22, have time constants and delays which make instantaneous correction within the 10 milliseconds of the exposure time difficult. In order to have full compensation for the position of the film during this time, the servo loop comprising the film 102, CCD sensor 110, image processor 15, servo control 17, valves 19 and 20 and nozzles 21 and 22 impinging air on film 102 would need to have a settle out time of around 2 milliseconds. Primarily because of the response times of control valves 19 and 20, and the time it takes the air through nozzles 21 and 22 to reach the film, a 2 millisecond settling time is impractical.

Nonetheless, some instantaneous correction within the exposure frame can take place.

2. Compensation between exposures in the same frame. This control strategy uses the data regarding film motion during period 26 (FIG. 6) and 27 to initiate the air blasts so that a more complete compensation is achieved by the time period 28 occurs. Thus, a time of between 10 and 20 milliseconds is available to sense the position of the film and then set the level of the valves. This level ensures that an airflow is produced which is predicted to move the film back or forward to within the depth of focus of the projector lens 105. Implementation of this strategy requires that the servo system 17 receive on line 29 a signal indicating both the position of the shutter and when film motion is taking place. This information is used to determine when period 26 is about to begin. The initial speed of motion of the film in the z direction at the beginning of period 26 is used as a predictor to the amount of air that is required to both compensate between period 26 and also compensate during periods 27 and 28. This strategy does not use measurements during period 28 to predict the compensation required during period 24 and 26 of the next film frame.

This component of the servo strategy may also take into account that human factors studies suggest that the eye is able to sense when a frame has been changed. Furthermore, it is possible that the initial exposure of a frame need not be as sharp as the second exposure as the eye may then have better fixation on the detail of the image. Thus while it appears to be important that the second exposure be in good focus there may in fact be some motion of the film in the first exposure that does not necessarily deteriorate the perceived sharpness of the image.

This also means that the position of the film at the beginning of the first exposure may not need to be in the final focal position in the film gate. Furthermore, some degree of the film being out of focus may not result in the perception of degraded sharpness of the image on the screen. However, it is possible that the second exposure should fall well within the depth of focus of the lens. Accordingly, a desirable approach may be that, during the first exposure, the air jets from nozzles 21 and 22 actually initially distort the film towards the focal plane and then hold it in that position through the second exposure.

The degree to which it is desirable that the film not be planar with the film gate is determined in part by the design of the projection lens. For example, the Issco Ultravision lenses are designed for the film focal plane to be curved and so the goal of the servo system is to position the film so that it matches the focal plane curve of the lens design.

3. Compensation between frames based on the assumption that energy absorbed by the film in consecutive frames is likely to be the same. Unless there is a scene change between two frames, adjacent frames will absorb similar amounts of energy and therefore will require the same compensation. The control strategy in this case is to base the air blast control profile of the current frame on the air blast control profile of the previous frame while adding corrections based on the air blast control profile of the current frame to correct for the deviations from ideal within the previous frame.

In using this strategy the servo function must compute the necessary corrections between frames and (as in the case of predictive corrections) take into account the intrinsic lag in the air jet control valves 19 and 20 as well as the consequent film response.

It is also necessary to compare z position data on line 16 of the succeeding frame and use that data as the basis for calculating the correction to be applied in the frame subsequent to the current frame.

4. Compensation between frames based on the amount of light passing through the current frame. Strategy 3 above works well if the consecutive frames are similar. However, strategy 3 can result in considerable errors in the z position of the film if the current frame is the first frame of a cut or scene change. To compensate for this a sensor 30 may be positioned adjacent to the projection lens (see FIG. 1) to sense the total amount of light passing through each frame. This data is sent on line 31 to the servo control system function 17 (FIG. 4). The control function compares the total amount of light from the last frame with the total amount of light sensed by sensor 30 on the previous frame. If these amounts are similar then strategy 3 above is used along with strategies 1 and 2. If however the amount of light sensed is substantially different (e.g., greater than 5% difference in total light intensity), strategy 3 is ignored and only 1 and 2 are used or alternatively the air blast control file upon which is implemented is selected from a library of air blast control profiles stored in servo control function 17, based on the amount of light sensed on line 31. Specifically, the profile, which is closest in terms of being optimized for that total amount of light, is selected.

The library of selected profiles may be created using test frame sequences of various overall density levels and determining the optimum blast control profiles for each density level.

It will be appreciated that this library selection process takes place at the beginning of period 26 in FIG. 6.

Because the previous frame is unrelated to the current frame the air blast control from the library is the profile that is used during this frame and it is corrected using strategies 1 and 2 but not strategy 3.

5. Global correction of algorithms. When the film is initially loaded or when each showing of the film is begun, it is possible for the servo control function 17 to generate control signals to flex the film to assess the overall response characteristics of the overall system comprising the film 102, CCD sensor 110, image processor 15, servo control 17, valves 19 and 20 and nozzles 21 and 22 impinging air on film 102. The control signals cause the film to move in the z direction and the amount and characteristics of the movement are used to analyze the response transform of the system. Ideally, test images of the same film could be used or the system could be perform this function at a test showing of the film. In addition, the system prediction parameters can be optimized by observing the response to the control inputs as a function of shutter position and light sensor 30 response.

Once the response is analyzed, the response characteristics are used to compute the optimal serve control parameters for each of the previous strategies.

6. Total movie storage and correction When the film is initially loaded or when each showing of the film is begun, it is possible for the servo control function to generate control signals to focus the film. The control signals cause the film to move in the z direction and the amount and characteristics of the movement are stored for the entire movie to be used at future showings to compensate for z position. This approach takes advantage of the fact that focus correction for each frame will be similar for successive showings of the movie. In each pass, each frame will have a slightly different z correction and using the sensing and servo system, small changes from the previous showing will be applied for each successive showing. The resulting overall z correction for each frame is updated in memory to be used for the next showing.

Correction for Multiple Points Across the Film Frame When it is desired to compensate for the uneven heating of the film due to image content, multiple laser diodes may be used instead of the single laser diode 108. Alternatively, the laser beam may be scanned in a synchronous manner across the surface of the film.

When multiple laser diodes are used, CCD 110 (FIG. 1) will see multiple points of light through lens 109. Then the task of image processor 15 (FIG. 4) is to determine the coordinates of each of those points of light as a first step in determining the z position of the film frame at each of the multiple points corresponding to the multiple spots from the laser diodes.

Figure 8:
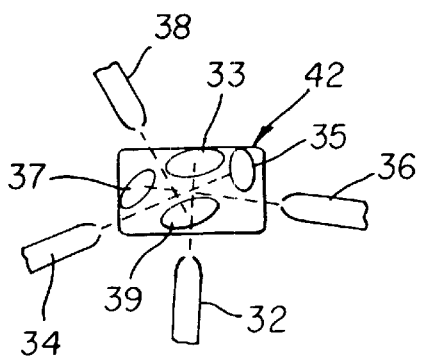
FIG. 8 shows a schematic view of a first pattern of multiple air jets which may be used to compensate for uneven displacement across an individual film image frame.

In addition as shown in FIG. 8, in order to compensate for uneven displacement across an individual film image frame, multiple air jets must be used. These air jets preferably may impinge radially around the film generally in an odd number and drive air in narrow blasts across the film. Consequently, the blast from air jet 32 falls in area 33, the blast from air jet 34 falls in area 35, the blast from area air jet 36 falls in area 37 and the blast from air jet 38 falls in area 39. The reason for this preferred pattern is that while air from a jet forms a narrow and only slightly diverging cone once the air jet hits the film it scatters over a larger area. With this layout the scattering of the air pressure will be directed outside the film and not interfere with the pressure from the other air jets impinging on the film. In this radial pattern as shown in FIG. 8 the air jets must be directed from the film in different elevations in order to ensure that there is minimal intersection between the blasts where they cross over in the center of the film.

Figure 9:
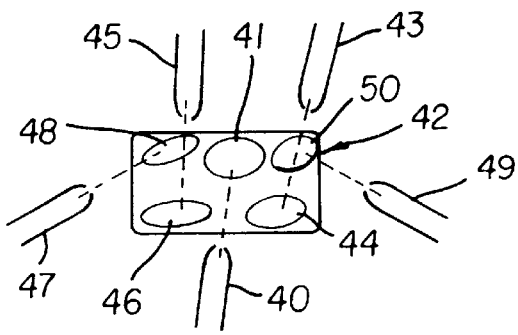
FIG. 9 shows a schematic view of an alternate pattern of multiple au-jets which may be used to compensate for uneven displacement across an individual film image frame.

FIG. 9 shows an alternate path for multiple air jets impinging on the film. In this case, air jet 40 blows in area 41 of the frame 42. Air jet 43 blows in area 44, air jet 45 blows in area 46 and air jet 47 blows in area 48 and air jet 49 blows in area 50. This is another example of a pattern that ensures that the air jets do not intersect.

When using multiple air jets, multiple laser diodes would be set up so that their beams would impinge on the specific areas influenced by each air jet. In addition, a central laser diode provides a beam so that the image-processing unit 15 (in FIG. 4) can also report to the control system servo 17 the position of the center of the film frame. Consequently, the center position in the z direction is controlled by the sum of the pressures of the jets on each side of the film.

Control strategies as previously outlined may be used to with an additional strategy which may be developed analytically or experimentally or both which provides for strategies for individual jets while minimizing the effects of jet interference. This is done using a matrix or multidimensional look up table approach, which may be of linear form or polynomial form. In the case of the matrix, the coefficients of the matrix reflect the interaction between jets as well as defining the incremental change in air pressure, which is necessary for an incremental change in z value in each region.

Loudspeaker Control One disadvantage of using air jets is that a source of pressurized air is required. Another disadvantage is that air jets are inclined to make additional noise in the projector room. To overcome these problems a loud speaker arrangement as shown in FIG. 10 may be used. A baffle tube 51 that extends from the film gate to the projection lens barrel 52 seals the air between the film 102 in film gate 101 and the projection lens. A loud speaker 53 is connected into the tube 51. The design of the loud speaker is such that it is able to develop high pressures by using a cone structure which is considerably more rigid than the film 102 and is therefore able to exert considerable pressure to flex the film. Tube 51 is preferably baffled (not shown) to minimize standing waves and ringing especially at the resonant frequencies of the tube speaker assembly.

A pressure-equalizing valve 54 that is magnetically controlled by solenoid assembly 55 is able to be opened to equalize the pressure in the assembly. Servo control system function 17 controls both loud speaker 53 and pressure equalizing valve 54. The pressure generated by loud speaker 53 flexes the film so that the film is maintained within the desired depth of focus of lens 105 (FIG. 1) in barrel 52.

The speaker 53 operating in cooperation with valve 54 achieves, during the shutter dark periods or during the film pull down period, pressure equalization of the tube 51. If it is desired to increase the pressure in the tube, the speaker reduces the pressure as the valve opens by moving the cone of the speaker in direction 56. The valve 54 is then closed by solenoid 55 and the speaker returns to its rest position thereby increasing the pressure within the volume of tube 51. Conversely if it is desired to reduce the pressure, as the valve opens speaker 56 moves in the direction opposite to direction 56 thereby causing air to blow out through valve gate 54. The valve is then closed and the speaker moves to its at rest position generating a negative pressure within the tube 51. In other respects, control of the film 102 may be similar to that already described with the jets 21 and 22.

Another method of pressure equalization is to use a small air pump to increase or decrease the pressure in the tube under control of the servo control function 17. Thus while loudspeaker 53 takes care of rapid corrections, slower and more gradual corrections are achieved by either controlling the speed and direction of the pump or by valves that select either the positive pressure reservoir or negative pressure reservoirs maintained by one or two small pumps.

Figure 11:
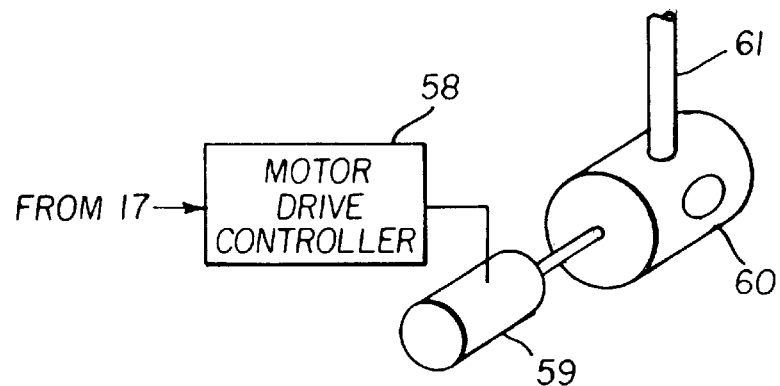
FIG. 11 diagrammatically illustrates a single air pump system which may be used in the system for controlling position of film in a film gate of FIG. 10.
Figure 12:
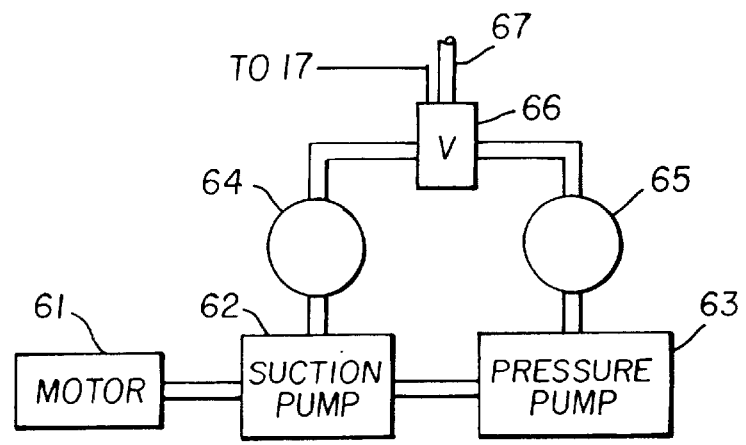
FIG. 12 diagrammatically illustrates a dual air pump system which may be used in the system for controlling position of film in a film gate of FIG. 10.

FIG. 11 shows the single pump approach diagrammatically. Motor drive controller 58 that in turn is controlled by signals from the servo control function 17 controls the motor 59. The servo control function sensing the required air pressure in the enclosed volume of the tube or hose 51 sends a control signal to the motor control function 58 which controls motor 59 to drive the positive displacement rotary pump 60. This pump is connected via hose 61 to the tube 51 to control the pressure inside the tube and therefore control the position of film 102. An alternate approach is shown in FIG. 12 where a constantly running motor 61 drives a suction pump 62 and a pressure pump 63. These pumps are controlled to maintain a constant pressure in pressure vessel 64 and a constant suction or vacuum in pressure vessel 65. An electrically operated control valve 66 provides either positive or negative pressure through tube 67 which controls the average pressure within the volume of hose or tube 51 to thereby control the position of film 102. The control valve 66 is connected to the servo control system 17 and partially switches to either the pressure reservoir 64 or the partial vacuum or negative pressure reservoir 65 to sustain a control pressure through line 67.

Although we have discussed varioius ways to sense the film in the gate and therefore compensate for it is also possible to pre-calibrate the amount of movement of the film as a function of the average density of each frame and then calibrate it so that by simply measuring the average density of each frame corrections are applied based on the pre-calibrated data of motion or required correction as a function of film density. Average densities may be determined, e.g., by shining a light through each image frame and using a large area sensor to determine the total light transmitted, or by scanning the individual film image frames to be projected with a CCD scanner and summing the scanned data.

Another way to prevent film flutter is to pressurize the film against a window in the gate. The difficulty of this approach is keeping the window clean and free from scratches. Pulling the window back away from the film during film motion addressES this.

Another system for correcting for film flutter that does not involve air pressure is shown in FIG. 15. In this embodiment of the invention, the focal plane of the projection lens system of a projector is adjusted in response to the sensed position of the image frame relative to the focal plane of the projection lens system. A primary projection lens 1501 is focused on film 1502 and a thin flat liquid inflatable lens 1503 is positioned towards the film. This lens comprises optical quality plastic sheets molded or ground to the desired optical characteristic as shown in FIG. 16 and between those sheets 1601 and 1602 shown in cross section in FIG. 16, there is a clear liquid 1603. A short rigid hose 1504 connects to a pressure generator 1505. This pressure generator is controlled by the flutter servo system. Alternatively, the pressure generator may be mounted directly on the lens 1503. The primary lens 1501 and the inflatable lens 1503 together and establish the focal plane of the projection lens assembly of the projector. To compensate for the motion of the film, pressure may be applied to the liquid through hose 1504 so that the fluid 1603 causes one or both sides of the lens assembly 1601 and 1602 to move apart to compensate for the increase in path length caused by the film 1502 moving from position 1506 to 1507.

It will be appreciated that if the emulsion is towards the lamp, as is conventional, is the film will heat up and move in the direction shown by 1507. However if the emulsion is towards the lens then the film in the gate will tend to buckle in the 1508 direction because the heat on the film will expand on the side of the film where the emulsion is absorbing the energy.

There are optical advantages in having the emulsion towards the lens although this is not the standard practice for movie systems. These advantages accrue because with the emulsion towards the lens surface roughness on the film on the side towards the lens has less effect on the sharpness of the image in the emulsion as perceived by the lens.

The distance of the inflatable lens assembly 1503 from the film 1502 is a matter of design choice. By making this distance small the effect of increasing the pathway will dominate over the effect of changing the shape of the surface of the lens. Increasing the thickness increases the path length, curving the surface will slightly redirect the light. The optimal design of this lens assembly will curve the focal plane of the projection lens to match the curvature of the film. Thus the design process for this assembly can allow for the actual shape of the curvature of the film as it is heated up by choosing the design and positioning of the design element 1503.

Figure 17:
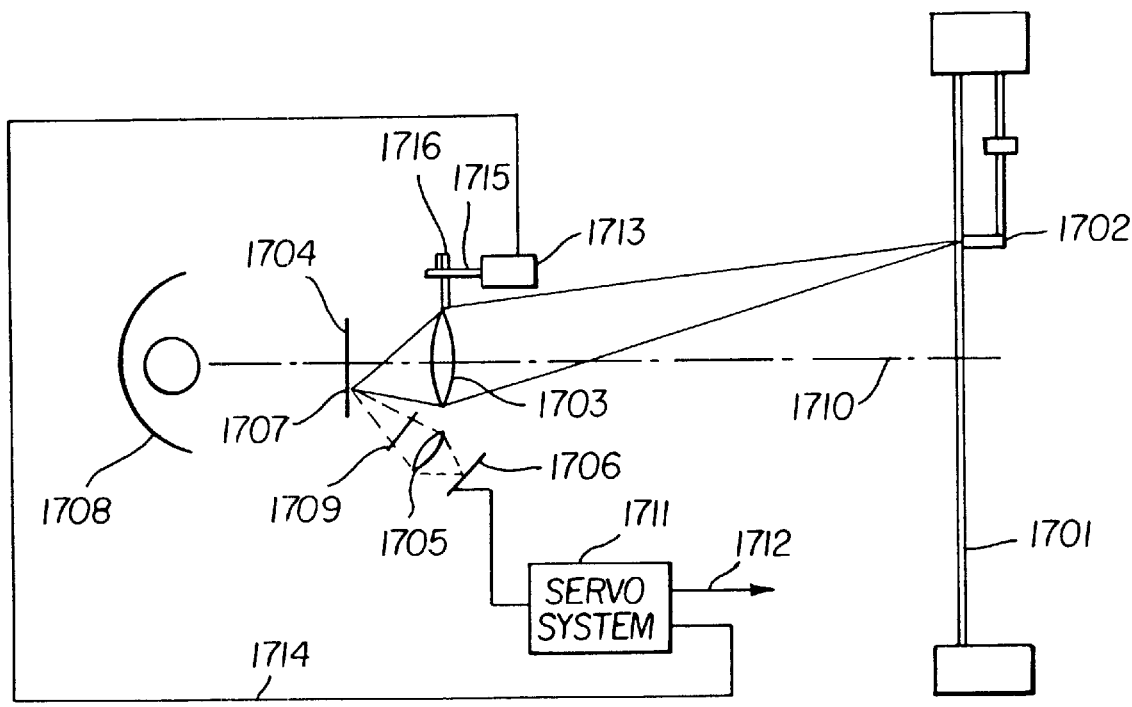
FIG. 17 diagrammatically illustrates a system which may be used to automatically focus a projector on a screen and also compensate for film flutter.

In some instances it is highly desirable that the projectionist not be required to focus the projector on the screen as an initial set up, but that focus be fully automatic and also compensate for film flutter. An arrangement to do this is shown in FIG. 17. Projection screen 1701 has sound holes to allow sound from the speakers behind. An infrared or non-visible light laser diode 1702 is positioned such that through one of the sound holes a beam is focused back to the projection lens 1703. This beam is then focused by the lens onto film 1704 and a sensor assembly comprising lens 1705 and CCD sensor device 1706 senses the scattered laser light from the film 1704. The size of the spot on the film at 1707 is sensed by sensor 1706 to determine if the film is in focus with the screen.

In order to ensure that the sensor 1706 is not blinded by the light passing through the film from the illuminator assembly 1708, a narrow bandwidth filter corresponding to the laser diode wavelength is inserted at 1709. By mounting the laser diode away from the optical axis 1710 of the projector the sensor 1706 can detect both the size of the spot which will be smallest when it is in focus and also the direction of focus due to the position of the spot depending on whether the film is behind the, focal point of the system or in front of the focal point.

Because of possible dispersion in the projector lens 1703 the actual focal point of the projector to optically visible light may be different from the focal point of the non-visible laser light and compensation will therefore be necessary in the servo system to ensure that it does not focus at the smallest point of the laser image on film 1704 but at the size of the laser focus point that corresponds to the visible light in-focus position of the projector lens.

In order to ensure automatic focus a servo system 1711 that receives the signal from the sensor 1706 will need to control two elements. One is the air pressure control mentioned earlier in this specification or alternatively the liquid controlled lens shown in FIGS. 15 and 16. One of these would be controlled through control line 1712. In addition for the initial set up and slow adjustment of focus a motor 1713 is controlled by line 1714 through a screw thread 1715 onto a nut 1716 which moves the lens back and forth along the optical axis to provide large travel focus adjustment with a slow response time. By contrast the control line 1712 provides rapid response focus adjustment.

Figure 18:
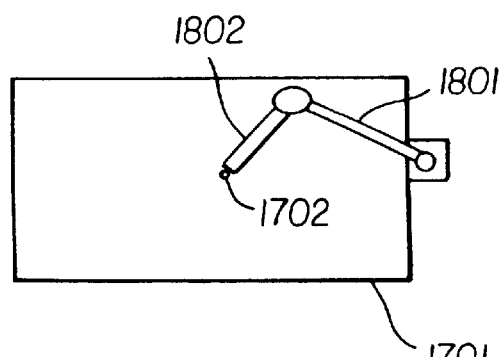
FIG. 18 illustrates a laser diode positioning assembly which may be used in the system of FIG. 17.

In order to ensure that the laser 1702 maintains an angle that directs light back to the projector lens while being aligned with the sound hole in the screen and does not place any pressure on the screen to wrinkle the screen a torsionally rigid spring counterweighted arm assembly may be used as shown in FIG. 18. This assembly comprises two rigid arms 1801 and 1802 that support the laser diode 1702 in screen 1701. FIG. 18 shows this arrangement as viewed from the back of the screen.

It is also possible to sense focus of the projector by using an electronic camera to view the screen and sense whether the image content such as grain is in focus using one of many prior art focus-sensing algorithms such as those in consumer TV cameras or high frequency sensing algorithms.

Instead of using air pressure focus can also be obtained by adjusting the projection lens or film gate position using piezo-electric transducers in combination with a z-axis motor drive. The piezo-electric transducers would compensate for film flutter while the z-axis motor drive would handle slower high magnitude motion. If a fast z axis servo were available it could handle both fast and slow motion.

The invention has been described in detail with particular reference to certain preferred embodiments thereof, but it will be understood that variations and modifications can be effected within the spirit and scope of the invention.

What is claimed is:

1. A system for compensating for film flutter in a motion picture film projector during projection of a motion picture film comprising multiple film image frames, the system comprising:

sensing the position of film image frames in a film gate of the projector relative to the focal plane of the projection lens assembly of the projector as the film image frames are being projected, and correcting the position of the film in the film gate of the projector or the position of the focal plane of the projection lens assembly to reduce the distance between the film image and the focal plane of the projection lens assembly as the film image frames are being projected, wherein the correction of the position of an individual film image frame in the film gate or that of the position of the focal plane of the projection lens assembly during projection of the individual frame image is based on the actual sensed position of the individual film image frame in the film gate, or on the position of a previously projected film image frame which was sensed as it was being projected, and wherein correction control signals are recorded for each image frame of the motion picture as it is projected, and the recorded control signals are used in a subsequent projection of the motion picture film.

2. A system according to claim 1, wherein the position of the film in the film gate is sensed optically.

3. A system according to claim 1, wherein the position of the film in the film gate is sensed acoustically.

4. A system according to claim 1, wherein the position of the film in the film gate of the projector is corrected to move the film closer to the focal plane of the projector lens.

5. A system according to claim 4, wherein the position of the film in the film gate is corrected by directing a jet of air under pressure against the film in the film gate through a control valve responsive to the sensed position of the film.

6. A system according to claim 5, wherein the position of the film in the film gate is corrected by directing at lest one jet of air on each side of the film in the film gate through control valves responsive to the sensed position of the film.

7. A system according to claim 5, wherein the position of the film in the film gate is corrected by directing multiple jets of air on at least one side of the film in the film gate through control valves responsive to sensed positions of the film.

8. A system according to claim 4, wherein the position of the film in the film gate is corrected by selectively increasing or decreasing pressure in an enclosure between the film gate and the projection lens.

9. A system according to claim 1, wherein the position of the focal plane of the projection lens assembly of the projector is corrected to move the focal plane closer to the film image in the film gate.

10. A system according to claim 1, wherein the position of the film in the film gate or the focal plane of the projection lens assembly is at least partially corrected during a specific frame exposure in response to the position of the film relative to the projection lens assembly actually sensed during the specific frame exposure.

11. A system according to claim 1, wherein the position of the film in the film gate or the focal plane of the projection lens assembly is corrected during a second exposure of a specific image frame in the film gate prior to advancement of the motion picture film to a subsequent image frame in response to the position of the film actually sensed in the film gate relative to the focal plane of the projection lens assembly during a first exposure of the specific image frame in the film gate.

12. A system according to claim 1, wherein the position of the film in the film gate for a specific image frame or the focal plane of the projection lens assembly is corrected based upon the position of the film in the film gate relative to the focal plane of the projection lens assembly sensed during projection of a preceding image frame.

13. A system according to claim 1, further comprising sensing the total amount of light passing through each image frame as it is projected, and for image frames wherein the amount of light passing through is not significantly different than the amount of light passing through the preceding image frame wherein the position of the film in the film gate for a specific image frame is corrected based upon the position of the film in the film gate sensed in the preceding image frame.

14. A system according to claim 1, wherein optimal position control parameters are computed based upon response characteristics of the system to test correction control signals.

15. A system for compensating for film flutter in a motion picture film projector during projection of a motion picture film comprising multiple film image frames, the system comprising:

sensing the position of film image frames in a film gate of the projector relative to the focal plane of the projection lens assembly of the projector as the film image frames are being projected, and correcting the position of the film in the film gate of the projector or the position of the focal plane of the projection lens assembly to reduce the distance between the film image and the focal plane of the projection lens assembly as the film image frames are being projected, wherein the correction of the position of an individual film image frame in the film gate or that of the position of the focal plane of the projection lens assembly during projection of the individual frame image is based on the actual sensed position of the individual film image frame in the film gate, or on the position of a previously projected film image frame which was sensed as it was being projected, and optimal position control parameters are computed based upon response characteristics of the system to test correction control signals.

16. A system according to claim 15, wherein the position of the film in the film gate is sensed optically.

17. A system according to claim 15, wherein the position of the film in the film gate is sensed acoustically.

18. A system according to claim 15, wherein the position of the film in the film gate or the focal plane of the projection lens assembly is corrected during a second exposure of a specific image frame in the film gate prior to advancement of the motion picture film to a subsequent image frame in response to the position of the film actually sensed in the film gate relative to the focal plane of the projection lens assembly during a first exposure of the specific image frame in the film gate.

19. A system according to claim 15, wherein the position of the film in the film gate for a specific image frame or the focal plane of the projection lens assembly is corrected based upon the position of the film in the film gate relative to the focal plane of the projection lens assembly sensed during projection of a preceding image frame.

20. A system according to claim 15, further comprising sensing the total amount of light passing through each image frame as it is projected, and for image frames wherein the amount of light passing through is not significantly different than the amount of light passing through the preceding image frame wherein the position of the film in the film gate for a specific image frame is corrected based upon the position of the film in the film gate sensed in the preceding image frame.

* * * * *